US012674056B2

(12) United States Patent
Kimura et al.

(10) Patent No.: US 12,674,056 B2
(45) Date of Patent: Jul. 7, 2026

(54) RESIN COMPOSITION, MOLDED ARTICLE, MASTER BATCH, AND MANUFACTURING METHODS THEREFOR

(71) Applicant: DIC Corporation, Tokyo (JP)

(72) Inventors: Toshiki Kimura, Ichihara (JP); Yutaka Takezawa, Ichihara (JP); Hironobu Takizawa, Ichihara (JP)

(73) Assignee: DIC Corporation, Tokyo (JP)

( * ) Notice: Subject to any disclaimer, the term of this patent is extended or adjusted under 35 U.S.C. 154(b) by 853 days.

(21) Appl. No.: 17/786,576

(22) PCT Filed: Dec. 17, 2020

(86) PCT No.: PCT/JP2020/047074

§ 371 (c)(1),
(2) Date: Jun. 17, 2022

(87) PCT Pub. No.: WO2021/125251

PCT Pub. Date: Jun. 24, 2021

(65) Prior Publication Data

US 2023/0045234 A1 Feb. 9, 2023

(30) Foreign Application Priority Data

Dec. 18, 2019 (JP) ................................ 2019-228227

(51) Int. Cl.

| | |
|---|---|
| ***B29C 44/02*** | (2006.01) |
| ***C08J 3/22*** | (2006.01) |
| ***C08J 5/04*** | (2006.01) |
| ***C08L 1/02*** | (2006.01) |
| ***C08L 75/04*** | (2006.01) |
| *B29C 45/00* | (2006.01) |
| *B29K 33/00* | (2006.01) |
| *B29K 75/00* | (2006.01) |
| *B29K 201/00* | (2006.01) |

(52) U.S. Cl.

CPC .............. *C08L 75/04* (2013.01); *B29C 44/02* (2013.01); *C08J 3/226* (2013.01); *C08J 5/045* (2013.01); *C08L 1/02* (2013.01); *B29C 45/0001* (2013.01); *B29K 2033/08* (2013.01); *B29K 2075/02* (2013.01); *B29K 2201/00* (2013.01); *C08J 2333/08* (2013.01); *C08J 2375/04* (2013.01); *C08L 2205/03* (2013.01); *C08L 2310/00* (2013.01)

(58) Field of Classification Search

CPC .......... C08L 1/02; C08L 93/04; B29C 48/022; B29C 48/023

See application file for complete search history.

(56) References Cited

U.S. PATENT DOCUMENTS

| | | | | |
|---|---|---|---|---|
| 2008/0214699 | A1* | 9/2008 | Halahmi ................. | B29C 48/67 523/222 |
| 2011/0159308 | A1* | 6/2011 | Brondsema .......... | C09D 129/04 428/500 |
| 2013/0289170 | A1 | 10/2013 | Takizawa et al. | |
| 2021/0198455 | A1* | 7/2021 | Miyoshi .................... | C08L 1/02 |
| 2021/0214536 | A1 | 7/2021 | Tateishi | |

FOREIGN PATENT DOCUMENTS

| | | | |
|---|---|---|---|
| WO | 2012/043558 | A1 | 4/2012 |
| WO | 2019/220633 | A1 | 11/2019 |

* cited by examiner

*Primary Examiner* — Thu Khanh T. Nguyen

(74) *Attorney, Agent, or Firm* — Troutman Pepper Locke LLP; James E. Armstrong, IV

(57) ABSTRACT

The invention provides a thermoplastic resin composition, a molded article, and production methods therefor. The thermoplastic resin composition can sufficiently exhibit a cellulose addition effect and impart excellent mechanical strength to the molded article, particularly a foam molded article. More specifically, the invention provides a resin composition and a foam molded article thereof. The resin composition contains: a cellulose fiber (A); an amorphous resin (B) having a glass transition temperature of 160° C. or lower; a crystalline resin (C) having a melting point (melting peak temperature) of 80° C. to 150° C. and a melting start temperature lower than the melting point by 30° C. or more; and a thermoplastic resin (D) having a melting point or a glass transition temperature higher than the melting point of the crystalline resin (C) by 5° C. or more.

5 Claims, No Drawings

RESIN COMPOSITION, MOLDED ARTICLE, MASTER BATCH, AND MANUFACTURING METHODS THEREFOR

TECHNICAL FIELD

The present invention relates to a resin composition containing a cellulose fiber (hereinafter, simply referred to as "resin composition"), and particularly relates to a master batch containing a thermoplastic resin as a main component, a resin composition, a molded article, and production methods therefor.

BACKGROUND ART

As the mobility of a product progresses, weight reduction of a material that forms the product is becoming more and more important. However, as the specific gravity of the material decreases, the rigidity of the material tends to decrease, and thus various materials are studied to eliminate trade-off. Among these, from the viewpoint of productivity, a material which contains a thermoplastic resin as a main component has been widely studied.

A cellulose fiber developed in recent years has been attracting attention as a low-specific gravity and high-strength composite material for a resin. Cellulose having many hydroxy groups is often subjected to defibering in water, and a cellulose fiber after the defibering contains a large amount of water. Therefore, it is necessary to execute a dehydration step during compositing with various resins, and the cellulose fiber after the defibering is often re-aggregated in this step, making uniform dispersion in the resins difficult. As one means to solve such a problem, for example, there is provided a method of directly mixing an aggregate of cellulose with a polyester-based resin without using a medium such as water and refining the cellulose in the resin to obtain a master batch containing a high concentration of cellulose fibers (see, for example, PTL 1).

However, there is a problem that a defibered state of the cellulose is insufficient in a composite of the master batch and another thermoplastic resin, particularly a thermoplastic resin having a high melting point or a high glass transition temperature, and a cellulose addition effect for the mechanical strength of the obtained molded article is small.

In addition, a weight reduction method for the molded article by combining a composite material containing the cellulose and foam molding has been developed, and a solution for a problem that the property of a foamed body produced by the cellulose in the defibered state does not reach a practical level has also been proposed.

CITATION LIST

Patent Literature

PTL 1: WO 2012/043558

SUMMARY OF INVENTION

Technical Problem

In view of the above circumstance, an object of the invention is to provide a thermoplastic resin composition, a molded article, and production methods therefor, which can sufficiently exhibit the cellulose addition effect and impart excellent mechanical strength to a molded article, particularly a foam molded article.

Solution to Problem

As a result of intensive studies to solve the above problem, the present inventors have found that the problem can be solved by a method in which a cellulose fiber is mixed with a specific thermoplastic material and the obtained mixture is diluted with a thermoplastic resin having a melting point or a glass transition temperature higher than that of the thermoplastic material. Thus, the invention has been completed.

That is, the invention relates to a resin composition containing: a cellulose fiber (A); an amorphous resin (B) having a glass transition temperature of 160° C. or lower; a crystalline resin (C) having a melting point (melting peak temperature) of 80° C. to 150° C. and a melting start temperature lower than the melting point by 30° C. or more; and a thermoplastic resin (D) having a melting point or a glass transition temperature higher than the melting point of the crystalline resin (C) by 5° C. or more.

In addition, the invention relates to a molded article that uses the resin composition.

In addition, the invention relates to a master batch containing: a cellulose fiber (A); an amorphous resin (B) having a glass transition temperature of 160° C. or lower; and a crystalline resin (C) having a melting point (melting peak temperature) of 80° C. to 150° C. and a melting start temperature lower than the melting point by 30° C. or more.

In addition, the invention relates to a production method for a master batch including a step of melt-kneading an aggregate of a cellulose fiber (A), an amorphous resin (B) having a glass transition temperature of 160° C. or lower, and a crystalline resin (C) having a melting point (melting peak temperature) of 80° C. to 150° C. and a melting start temperature lower than the melting point by 30° C. or more, and a defibering auxiliary (E) having a boiling point of 120° C. or lower.

In addition, the invention relates to a production method for a resin composition, including: a step of producing a master batch by the production method; and a step of melt-kneading a thermoplastic resin (D) having a melting point or a glass transition temperature higher than the melting point of the crystalline resin (C) in the master batch by 5° C. or more.

Further, the invention relates to a production method for a molded article, including: a step of producing a resin composition by the production method; and a step of molding the obtained resin composition.

Advantageous Effects of Invention

The invention can provide a resin composition containing a cellulose fiber and a production method therefor. Even when the cellulose fiber is sufficiently defibered in the resin composition and molded into a foamed body, the resin composition is excellent in mechanical performance such as rigidity.

DESCRIPTION OF EMBODIMENTS

A cellulose fiber (A) used in the invention is a component having a function of reinforcing a molded article that contains a thermoplastic resin (D) described below as a main component of a matrix. The cellulose fiber (A) is obtained by defibering an aggregate of the cellulose fiber (A) which is a raw material. Note that, hereinafter, the undefibered cellulose fiber (A), which is a raw material, may also be referred to as the "aggregate of the cellulose fiber (A)" or an "undefibered material of the cellulose fiber (A)".

As the aggregate of the cellulose fiber (A) which is the raw material of the cellulose fiber (A), for example, one kind or two or more kinds selected from plant fibers (pulp) obtained from natural plant raw materials such as wood, bamboo, hemp, jute, kenaf, cotton, beet, agricultural waste, and cloth, and waste paper such as waste newspaper, cardboard waste paper, magazine waste paper, and copy paper waste paper can be used. Examples of the wood include sitka spruce, *cryptomeria japonica, chamaecyparis obtusa, eucalyptus*, and *acacia.*

The aggregate of the cellulose fiber (A) which is the raw material of the cellulose fiber (A) is preferably pulp or defibered pulp obtained by defibering the pulp. The pulp is preferably obtained by pulping plant raw materials chemically or mechanically, or in combination thereof.

As the pulp, for example, chemical pulp (kraft pulp (KP) and sulfite pulp (SP)), semi-chemical pulp (SCP), chemiground pulp (CGP), chemimechanical pulp (CMP), groundwood pulp (GP), refiner mechanical pulp (RMP), thermomechanical pulp (TMP), and chemithermomechanical pulp (CTMP) are preferred. In addition, as the pulp, deinked recycled pulp, cardboard recycled pulp, magazine recycled pulp, or the like which contains the above pulp as a main component may be used.

Among these, as the pulp, kraft pulp derived from softwood with high fiber strength such as softwood unbleached kraft pulp (NUKP), oxygen-prebleached softwood kraft pulp (NOKP), and softwood bleached kraft pulp (NBKP) is preferred. In addition, as the pulp, broad-leaved kraft pulp such as bleached kraft pulp (LBKP), unbleached kraft pulp (LUKP), and oxygen bleached kraft pulp (LOKP) may be used.

If necessary, the pulp may be subjected to a delignin treatment or a bleaching treatment to adjust the lignin content contained therein. Note that the pulp mainly contains cellulose, hemicellulose, and lignin.

The average fiber length of the aggregate of the cellulose fiber (A), which is the raw material of the cellulose fibers (A), is not particularly limited, and is preferably 0.5 mm or more, and more preferably 2.5 mm or more. The longer the fiber length, the higher the aspect ratio of the cellulose fibers (A) defibered in a crystalline resin (C) described later or the thermoplastic resin (D), and a reinforcing effect can be further improved.

The average fiber diameter (average fiber width) of the cellulose fiber (A) in the master batch or the resin composition obtained by defibering is preferably about 4 nm to 30 μm, and the average fiber length is in the range of preferably 1000 μm or less, more preferably 100 μm or less, and preferably 5 μm or more. Note that the average fiber diameter or the average fiber length of the cellulose fiber (A) can be expressed as, for example, an average value of values measured for at least 50 cellulose fibers (A) in a field of view of an electron microscope.

In addition, the specific surface area of the cellulose fiber (A) is not particularly limited, and is in the range of preferably 70 $m^2/g$ or more, more preferably 100 $m^2/g$ or more, and preferably 300 $m^2/g$ or less, more preferably 250 $m^2/g$ or less, still more preferably 200 $m^2/g$ or less.

By increasing the specific surface area of the cellulose fibers (A), a contact area with the crystalline resin (C) described later or the thermoplastic resin (D) in the resin composition can be increased, and the mechanical strength of a molded article produced from the resin composition can be further improved. In addition, by adjusting the specific surface area of the cellulose fibers (A), aggregation of the cellulose fiber (A) in the resin composition can be prevented, and a molded article with higher mechanical strength can be produced.

The content of the cellulose fiber (A) contained in the resin composition is appropriately set according to use of the molded article and the property required for the molded article, and is thus not particularly limited, and is preferably 0.1 mass % or more, more preferably 0.2 mass % or more, and preferably 30 mass % or less, more preferably 20 mass % or less. Note that, when the amount of the cellulose fiber (A) is increased, an effect of improving the mechanical strength of the molded article is large. On the other hand, when the content of the cellulose fiber (A) is reduced, an effect of improving the moldability and the continuous productivity of the molded article is easily obtained.

An amorphous resin (B) having a glass transition temperature of 160° C. or lower used in the invention has a function of promoting the defibering of the raw material of the cellulose fiber (A) and a function of stably dispersing in the crystalline resin (C) described later having a melting point (melting peak temperature) of 80° C. to 150° C. and a melting start temperature lower than the melting point by 30° C. or more. Note that the glass transition temperature, the melting start temperature, and the melting point in the invention are measured by methods described in Examples.

The structure of the amorphous resin (B) is not particularly limited, and from the viewpoint of effectively exhibiting the above functions, the structure of the amorphous resin (B) is preferably a resin having an ester bond, an ether bond, a urea bond, a hydrophilic functional group such as, a hydroxy group, an amino group, and a carboxyl group, and more preferably a hydrophilic acrylic resin or a hydrophilic urethane resin.

In the hydrophilic acrylic resin, it is particularly preferred to use a copolymer resin including a first structural unit based on an alkyl (meth)acrylate and a second structural unit based on an acrylic monomer having an amide group, and having a weight average molecular weight in the range of 5,000 to 100,000. Note that the molecular weight of the resin in the invention is measured by the methods described in Examples.

The number of carbon atoms of the alkyl group in the first structural unit is not particularly limited, and is preferably 6 or more, more preferably 8 or more, and preferably 18 or less, more preferably 15 or less. In addition, the amount of the first structural unit in all structural units constituting the acrylic resin is preferably 25 mass % or more, more preferably 30 mass % or more, and preferably 50 mass % or less, more preferably 45 mass % or less.

On the other hand, the amount of the second structural unit in all structural units constituting the acrylic resin is in the range of preferably 50 mass % or more, more preferably 55 mass % or more, and preferably 75 mass % or less, more preferably 70 mass % or less. Accordingly, the number (concentration) of amide groups in the acrylic resin is appropriate, the affinity with the cellulose fiber (A) is good, and the function as a dispersant can be effectively exhibited.

Specifically, the concentration of the amide groups in the acrylic resin is not particularly limited, and is in the range of preferably 1.4 mmol/g or more, more preferably 2.8 mmol/g or more, and preferably 9.9 mmol/g or less, more preferably 9.2 mmol/g or less. Note that the concentration of the amide groups is a value calculated based on the charged amount of the monomer as the raw material of the acrylic resin.

The weight average molecular weight of the acrylic resin is not particularly limited, and is in the range of preferably 5,000 or more, more preferably 10,000 or more, and preferably 100,000 or less, more preferably 50,000 or less. The acrylic resin having such a weight average molecular weight further increases the compatibility with the crystalline resin (C).

Note that the amount of each structural unit contained in the acrylic resin is substantially equal to the amount of each monomer contained in a monomer component which is the raw material of the acrylic resin.

The acrylic resin is obtained by polymerizing the alkyl (meth)acrylate and the acrylic monomer having an amide group.

Note that in the present description, the term "(meth) acrylic acid" represents either or both of "acrylic acid" and "methacrylic acid". The term "(meth)acrylate" represents either or both of "acrylate" and "methacrylate". The term "(meth)acrylamide" represents either or both of "acrylamide" and "methacrylamide". In addition, the alkyl group includes a cycloalkyl group.

Examples of the alkyl (meth)acrylate include cyclohexyl (meth)acrylate, hexyl (meth)acrylate, 2-ethylhexyl (meth) acrylate, lauryl (meth)acrylate, and stearyl (meth)acrylate, and lauryl (meth)acrylate is preferred. Note that the alkyl (meth)acrylate may be used alone or in combination of two or more thereof.

Examples of the acrylic monomer having an amide group include (meth)acrylamide, N-methyl (meth)acrylamide, N-ethyl (meth)acrylamide, N-propyl (meth)acrylamide, and N,N-dimethyl (meth)acrylamide, N,N-diethyl (meth)acrylamide, N,N-dipropyl (meth)acrylamide, N-isopropyl (meth) acrylamide, N-dodecylacrylamide, N-propoxymethylacrylamide, 6-(meth)acrylamide hexaneic acid, (meth) acryloylmorpholine, N-methylol (meth)acrylamide, N-(2-hydroxyethyl) (meth)acrylamide, N,N-dimethylaminopropyl (meth)acrylamide, and N-[2,2-dimethyl-3-(dimethylamino)propyl]acrylamide. Note that the acrylic monomer may be used alone or in combination of two or more thereof.

In addition, in addition to the alkyl (meth)acrylate and the acrylic monomer having an amide group, other monomers can be used for synthesis of the acrylic resin, as necessary.

Examples of the other monomers include monomers having a carboxyl group, such as (meth)acrylic acid, (anhydrous) maleic acid, fumaric acid, and (anhydrous) itaconic acid; (meth)acrylates having a functional group, such as 2-methylaminoethyl (meth)acrylate, 2-hydroxyethyl (meth) acrylate, 2-hydroxypropyl (meth)acrylate, 2-hydroxybutyl (meth)acrylate, 4-hydroxybutyl (meth)acrylate, tetrahydrofurfuryl (meth)acrylate, γ-methacryloxypropyl trimethoxysilane, vinyltriethoxysilane, and glycidyl (meth)acrylate; methyl (meth)acrylate, ethyl (meth)acrylate, propyl (meth) acrylate, butyl (meth)acrylate, isobornyl (meth)acrylate, benzyl (meth)acrylate, diethylene glycol di(meth)acrylate, di(meth)acrylic acid-1,4-butanediol, di(meth)acrylic acid-1, 6-hexanediol, tri(meth)acrylate trimethylolpropane, glycerin di(meth)acrylate, styrene, α-methylstyrene, p-methylstyrene, and chloromethylstyrene. Note that the other monomers may be used alone or in combination of two or more thereof.

The acrylic resin can be produced, for example, by radical polymerization of the alkyl (meth)acrylate, the acrylic monomer, and, if necessary, other monomers in an organic solvent in the presence of a polymerization initiator, preferably in a temperature range of 60° C. to 140° C. Note that the organic solvent may be removed by a solvent removal step after the radical polymerization.

Examples of the organic solvent include: aromatic solvents such as toluene and xylene; alicyclic solvents such as cyclohexanone; ester solvents such as butyl acetate and ethyl acetate; cellosolve solvents such as isobutanol, normal butanol, isopropyl alcohol, sorbitol, and propylene glycol monomethyl ether acetate; and ketone solvents such as methyl ethyl ketone and methyl isobutyl ketone. Note that the solvent may be used alone or in combination of two or more thereof.

Examples of the polymerization initiator include: azo compounds such as 2,2'-azobis(isobutyronitrile), 2,2'-azobis (2-methylbutyronitrile), and azobiscyanovaleric acid; organic peroxides such as tert-butyl peroxypivalate, tert-butyl peroxybenzoate, tert-butyl peroxy-2-ethylhexanoate, di-tert-butyl peroxide, di-tert-butyl hydroperoxide, cumene hydroperoxide, benzoyl peroxide, and tert-butyl hydroperoxide; and inorganic peroxides such as hydrogen peroxide, ammonium persulfate, potassium persulfate, and sodium persulfate. Note that the polymerization initiator may be used alone or in combination of two or more thereof. The polymerization initiator is preferably used in an amount of about 0.1 mass % to 10 mass % with respect to the total amount of the monomer which is the raw material of the acrylic resin.

In addition, the amide group contained in the acrylic resin also has a function of effectively capturing a metal ion by coordinate-bonding to the metal ion and preventing or inactivating deterioration of the resins (C) and (D) due to the metal ion. Note that examples of the metal ion include various types, such as a copper ion, a manganese ion, and a cobalt ion.

The hydrophilic urethane resin is not particularly limited, and for example, is preferably a urethane resin having a carboxyl group from the viewpoint of excellent industrial productivity.

Examples of the hydrophilic urethane resin include an aqueous polyester polyurethane resin which is a polymer having a pendant carboxyl group obtained from a polyester polyol formed by using a polycarboxylic acid and a glycol, a polyisocyanate compound, and a chain extender as necessary, and in which the carboxyl group is neutralized with ammonia, an organic amine, or the like.

As the polycarboxylic acid, from the viewpoints of reactivity and easy molecular weight adjustment, a dicarboxylic acid is preferably used, and an aromatic dicarboxylic acid or an aliphatic (alicyclic) dicarboxylic acid may be used. In particular, from the viewpoints of increasing the affinity (dispersibility) with the cellulose fiber (A) and improving the compatibility with the resin (C) and the resin (D), it is preferred to use the aromatic dicarboxylic acid alone, or to use the aromatic dicarboxylic acid in combination with an aliphatic dicarboxylic acid in an amount of 30 mass % or less in the polycarboxylic acid.

Examples of the aromatic dicarboxylic acid include: aromatic dicarboxylic acids such as terephthalic acid, isophthalic acid, phthalic acid, 1,4-naphthalenedicarboxylic acid, 2,5-naphthalenedicarboxylic acid, 2,6-naphthalenedicarboxylic acid, naphthalic acid, biphenyldicarboxylic acid, and 1,2-bis(phenoxy)ethane-P,P'-dicarboxylic acid, and anhydrides or ester-forming derivatives thereof; and aromatic hydroxycarboxylic acids such as p-hydroxybenzoic acid and p-(2-hydroxyethoxy) benzoic acid, and ester-forming derivatives thereof.

In addition, examples of the aliphatic (alicyclic) dicarboxylic acid include: aliphatic dicarboxylic acids such as succinic acid, adipic acid, azelaic acid, sebacic acid, maleic anhydride, and fumaric acid; alicyclic dicarboxylic acids such as 1,3-cyclopentanedicarboxylic acid and 1,4-cyclohexanedicarboxylic acid; and anhydrides or ester-forming derivatives thereof.

Examples of the glycol include: aliphatic diols such as ethylene glycol, propylene glycol, 1,3-propanediol, 1,4-butanediol, 1,5-pentanediol, 1,6-hexanediol, neopentyl glycol, diethylene glycol, triethylene glycol, polyethylene glycol, and dipropylene glycol; alicyclic diols such as 1,4-cyclohexanediol and 1,4-cyclohexanedimethanol; and diols such as bisphenol A, hydroquinone, and alkylene oxide adducts thereof.

The polyester polyol obtained by using the polycarboxylic acid and the glycol is generally preferably a linear polymer, and the use of a polyfunctional component is not hindered as long as the water dispersibility of the obtained aqueous polyester polyurethane resin and the affinity with the cellulose fiber (A) are not impaired. Examples of the polyfunctional component include: polycarboxylic acids such as trimellitic acid, pyromellitic acid, and cyclohexanetricarboxylic acid, and anhydrides or ester-forming derivatives thereof; and polyols such as glycerin, trimethylolethane, trimethylolpropane, and pentaerythritol.

In addition, examples of the chain extender include: pendant carboxyl group-containing diols; glycols such as ethylene glycol, diethylene glycol, propylene glycol, 1,4-butanediol, hexamethylene glycol, and neopentyl glycol; diamines such as ethylenediamine, propylenediamine, hexamethylenediamine, phenylenediamine, tolylenediamine, diphenyldiamine, diaminodiphenylmethane, diaminocyclohexylmethane, piperazine, and isophoronediamine; and hydrazines.

In addition, examples of the polyisocyanate compound include 2,4-tolylene diisocyanate, 2,6-tolylene diisocyanate, m-phenylene diisocyanate, p-phenylene diisocyanate, 4,4'-diphenylmethane diisocyanate, tetramethylene diisocyanate, hexamethylene diisocyanate, xylylene diisocyanate, lysine diisocyanate, isophorone diisocyanate, trimethylhexamethylene diisocyanate, 1,4-cyclohexylene diisocyanate, 4,4'-dicyclohexylmethane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, and 1,5-tetrahydronaphthalene diisocyanate.

A method for introducing a pendant carboxyl group may be any known method in the related art, and preferred examples of the method include a method using a pendant carboxyl group-containing polyester polyol obtained by copolymerizing, as a glycol component, a compound represented by the following formula when synthesizing a polyester, and a method using a pendant carboxyl group-containing chain extender represented by the following formula as a chain extender.

[Chem. 1]

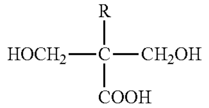

(In the formula, R represents an alkyl group having 1 to 3 carbon atoms.)

Examples of the compound represented by the above formula include 2,2-dimethylol propionic acid, 2,2-dimethylol butyric acid, and 2,2-dimethylol valeric acid.

In addition, examples of the method for introducing a pendant carboxyl group other than those described above include JP-B-S52-3438 (a method of using a two carboxyl group-containing aromatic diamine as a chain extender), JP-A-S57-165420 (a method of using a half ester from a polyhydroxyl compound and a dicarboxylic acid anhydride as a chain extender), JP-B-S53-7479 (a method of reacting an isocyanate-terminated prepolymer with an excess of polyalkylene polyamine to obtain a polyurethane urea polyamine, and then adding trimellitic anhydride to the polyurethane urea polyamine), and JP-B-S52-40677 (a method of synthesizing a high acid value polyester intermediate from a polyhydric alcohol and a polybasic acid and reacting the high acid value polyester intermediate with a polyisocyanate having an equivalent amount equal to or smaller than a hydroxy group).

From the viewpoints of obtaining a stable aqueous polyester polyurethane resin, having good affinity with the cellulose fiber (A), and capable of effectively exhibiting the function as the dispersant, the amount of the compound represented by the above formula to be used is preferably designed for synthesis such that the content of the pendant carboxyl group in the obtained polyester polyurethane is in the range of 0.5 mass % to 6 mass % with respect to the polyester polyurethane resin (solid content).

A production method for the aqueous polyester polyurethane resin is not particularly limited, and the aqueous polyester polyurethane resin is produced, for example, by reacting the pendant carboxyl group-containing polyester polyol, obtained by copolymerizing a carboxyl group-containing compound of the above formula with a hydrophilic organic solvent inactive to isocyanate, with a polyisocyanate compound, together with a chain extender as necessary, or by reacting a polyester polyol, a carboxyl group-containing compound of the above formula, and a chain extender as necessary, with a polyisocyanate compound to form a urethane, and then neutralizing the urethane with ammonia or an organic amine to form an aqueous solution (removing a solvent under a reduced pressure as necessary). In addition, during the reaction with the polyisocyanate compound, the isocyanate group may be added in an excess equivalent with respect to an active hydrogen atom to form a pendant carboxyl group-containing isocyanate prepolymer, and then the pendant carboxyl group-containing isocyanate prepolymer may be subjected to chain extension in water and to neutralization at the same time to obtain an aqueous solution.

In addition, in order to prevent gelation in the urethanization reaction, a reaction terminator such as alcohols such as methanol, ethanol, and isopropyl alcohol, and glycols such as ethylene glycol and 1,3-butanediol can also be used.

The weight average molecular weight of the polyester polyurethane resin thus obtained is not particularly limited, and is in the range of preferably 8,000 or more, more preferably 10,000 or more, and preferably 100,000 or less, more preferably 50,000 or less.

Examples of a base for neutralizing the pendant carboxyl group include, in addition to ammonia, organic amines such as trimethylamine, triethylamine, triisopropylamine, tributylamine, triethanolamine, methyldiethanolamine, dimethylethanolamine, and diethylethanolamine. Ammonia, trimethylamine, and triethylamine are preferred.

In addition, examples of the hydrophilic organic solvent inactive to isocyanate include: ethers such as tetrahydrofuran and dioxane; esters such as ethyl acetate; ketones such as acetone, methyl ethyl ketone, and cyclohexanone; and amides such as dimethylformamide and N-methylpyrrolidone.

In the invention, the ratio of the amorphous resin (B) to be used is not particularly limited, and the solid content of the amorphous resin (B) is in the range of preferably 5 parts by mass or more, more preferably 10 parts by mass or more, and preferably 100 parts by mass or less, more preferably 80 parts by mass or less, with respect to 100 parts by mass of the solid content of the cellulose fiber (A), from the viewpoints of further improving the dispersibility and the defibering property described above.

The crystalline resin (C) which is used in the invention, having a melting point (melting peak temperature) of 80° C. to 150° C. and a melting start temperature lower than the melting point by 30° C. or more is not particularly limited, and examples thereof include polyester, polyamide, polyimide, polyethylene, polypropylene, polybutylene, polyisobutyrate, ethylene-propylene copolymers, ethylene-vinyl acetate copolymers, and a mixture thereof. Among these, from the viewpoints of industrial availability, the strength of the obtained molded article, and the like, it is preferred to use an olefin-based resin such as polyethylene and polypropylene, and it is particularly preferred to use polyethylene having a specific gravity of 0.7 to 1.1. Preferred examples of such polyethylene include high-density polyethylene (HDPE), high-pressure low-density polyethylene (LDPE), and linear low-density polyethylene (LLDPE).

The thermoplastic resin (D) having a melting point or a glass transition temperature higher than the melting point of the crystalline resin (C) by 5° C. or more is not particularly limited. By using a resin having a melting point or a glass transition temperature higher than that of the crystalline resin (C) by 5° C. or more, a reinforcing effect of the resin made of the cellulose fiber (A) is improved, and the strength is also good during the formation of a molded article, particularly a foam molded article. In particular, it is preferred from the viewpoint that when this temperature difference is in the range of 5° C. to 100° C., the productivity when obtaining the resin composition by a kneading method described later is good, and the strength of the molded article is further increased.

Examples of the thermoplastic resin (D) include polypropylene, polycarbonate, polymethylpentene, nylon 6, nylon 66, polyamide, polyethylene terephthalate, polyether ether ketone, polyamideimide, polyphenylene sulfide, polyetherimide, polyetherketoneketone, and polyacetal. Among these, a crystalline resin is preferred from the viewpoint of obtaining a molded article having good dispersibility of cellulose fibers and high strength, and polypropylene, polyacetal, and polyamide are preferably used.

In the resin composition according to the invention, the composition ratio of the resin component is not particularly limited, and from the viewpoint of more excellent strength of the molded article and the like, the mass ratio (C)/(D) of the crystalline resin (C) to the thermoplastic resin (D) in the resin composition is preferably less than 0.5.

The resin composition according to the invention can be obtained by mixing the above components. From the viewpoint that the cellulose fiber (A) can be dispersed more efficiently, preferred is a method of obtaining a master batch containing: the cellulose fiber (A); the amorphous resin (B) having a glass transition temperature of 160° C. or lower; and the crystalline resin (C) having a melting point (melting peak temperature) of 80° C. to 150° C. and a melting start temperature lower than the melting point by 30° C. or more, and then mixing the master batch with the thermoplastic resin (D). At this time, the thermoplastic resin (D) can be previously blended with the master batch as long as the dispersibility of the cellulose fiber (A) in the master batch is not impaired.

The production method for a master batch according to the invention includes a step of blending the cellulose fiber (A), the amorphous resin (B), and the crystalline resin (C), and melt-kneading the mixture (also referred to as "step (1)").

At this time, as the cellulose fiber (A), a fiber in a hydrated state may be used, and in particular, it is more preferred to use, as a raw material, a hydrous cellulose fiber containing 5 parts by mass or more of water with respect to 100 parts by mass of the cellulose fiber.

First, the cellulose fiber (A), the amorphous resin (B), and the crystalline resin (C) are blended, and if necessary, other colorants or additives which are any raw material components, are premixed in various forms such as a bulk form, a pellet form, and a chip form as necessary, and then charged into a melt kneader, heated to a temperature equal to or higher than the melting point of the crystalline resin (C), and melt-kneaded. At this time, it is preferred that a defibering auxiliary (E) having a boiling point of 120° C. or lower is used in combination, from the viewpoint that the dispersion of the cellulose fiber (A) in a melt-kneaded product is good.

Examples of the defibering auxiliary (E) include water, various alcohols, ketones, and ethers, and from the viewpoint of good handling, water, ethanol, and isopropanol are preferably used.

The ratio of the defibering auxiliary (E) to be used is not particularly limited, and is in the range of preferably 5 parts by mass or more, more preferably 20 parts by mass or more, and preferably 200 parts by mass or less, more preferably 100 parts by mass or less, with respect to 100 parts by mass of the solid content of the cellulose fiber (A).

In the step (1), the blending ratio of the cellulose fiber (A), the amorphous resin (B), and the crystalline resin (C) is not particularly limited as long as an effect of the invention is not impaired. With respect to 100 parts by mass of the solid content of the cellulose fiber (A), the amorphous resin (B) is in the range of preferably 5 parts by mass or more, more preferably 10 parts by mass or more to preferably 100 parts by mass or less, more preferably 80 parts by mass or less, and the crystalline resin (C) is in the range of preferably 10 parts by mass or more, more preferably 30 parts by mass or more to preferably 150 parts by mass or less, more preferably 100 parts by mass or less. In addition, although in the step (1), it is not essential to previously blend the thermoplastic resin (D) into the master batch, in the case of blending the thermoplastic resin (D), the mass ratio (C)/(D) of the crystalline resin (C) to the thermoplastic resin (D) in the master batch may be preferably in the range of 3 to 20.

In the step (1), the premixing is not particularly limited as long as the effect of the invention is not impaired, and examples thereof include dry blending using a ribbon blender, a Henschel mixer, a V blender, or the like. In addition, the melt kneader is not particularly limited as long as the effect of the invention is not impaired, and examples thereof include a melt kneader provided with a heating mechanism, such as a Banbury mixer, a mixing roll, a single-screw or twin-screw extruder, and a kneader.

As the melt flow rate at 230° C. under a load of 5 kg of the master batch according to the invention thus obtained, the lower limit value thereof is in the range of 0.1 [g/10 min] or more, preferably 1 [g/10 min] or more, and the upper limit value thereof is not particularly limited, and is preferably 100 [g/10 min] or less.

According to the production method for a master batch including the step (1), a fiber having the average fiber diameter (average fiber width) of the cellulose fiber (A) of 4 nm to 30 μm and the average fiber length of 1000 μm or less in the master batch according to the invention can be easily obtained, and in particular, a fiber having an average fiber length in the range of 10 μm to 800 μm can be preferably obtained.

The production method for a resin composition according to the invention includes a step of blending the master batch obtained in a step including the step (1) with the thermoplastic resin (D) and any raw material component as necessary, and melt-kneading the mixture (also referred to as "step (2)").

First, the master batch, the thermoplastic resin (D), and any raw material component as necessary are premixed in various forms such as powders, pellets, and fine pieces as necessary, and then charged into a melt kneader, heated to a temperature equal to or higher than the melting point or glass transition temperature of the thermoplastic resin (D), and melt-kneaded.

In the step (2), the blending ratio (D/M) of the thermoplastic resin (D) to the master batch (M) is not particularly limited, and it is preferred to perform blending such that the mass ratio (C)/(D) of the crystalline resin (C) in the master batch (M) to the thermoplastic resin (D) is in the range of preferably less than 0.5, more preferably less than 0.4, and preferably 0.001 or more, more preferably 0.01 or more in the resin composition.

In the step (2), the premixing is not particularly limited as long as the effect of the invention is not impaired, and the same one as that used in the step (1) can be used. In the step (2), it is particularly preferred to premix the master batch processed into granules, the thermoplastic resin (D) in a form of granules, and any raw material component as necessary in a solid phase state since the dispersibility is improved.

In addition, in the step (2), the melt kneader is not particularly limited as long as the effect of the invention is not impaired, and the same one as that used in the step (1) can be used.

The form of the resin composition according to the invention thus obtained is not particularly limited as long as the effect of the invention is not impaired. After the melt-kneading, the resin composition may be extruded into a strand shape and then cut into granules having a pellet shape or a chip shape, or after the melt-kneading, the resin composition may be directly subjected to injection molding, compression molding, extrusion molding for a composite, a sheet, and a pipe, drawing molding, blow molding, transfer molding, or the like or subjected to the above molding after being melt-mixed in the form of granules, so as to obtain a molded article.

From the viewpoint of being lighter, the molded article according to the invention is preferably a foamed body. As a foaming agent, any one of physical foaming agents such as nitrogen and carbon dioxide, a supercritical foaming method using these, and chemical foaming agents such as calcium hydrogen carbonate, isobutane, isopentane, isooctane, dinitrosopentamethylenetetramine, azodicarbonamide, urea, and p,p'-oxybisbenzenesulfonyl hydrazide can be used without problems. Among these various foaming agents, a supercritical fluid improves the mechanical property of the obtained foamed body, and is thus preferred.

When a chemical foaming agent is used, the amount of the chemical foaming agent per 100 parts by mass of the resin composition is in the range of preferably 0.1 parts by mass or more, more preferably 1 part by mass or more, and preferably 15 parts by mass or less, more preferably 8 parts by mass or less. When the blending amount of the chemical foaming agent is within the above range, a high-strength foam molded article in which coarsening of foam cells is reduced and fine foam cells are uniformly dispersed can be obtained.

Note that as for a method of using the chemical foaming agent, the chemical foaming agent may be directly added to the resin composition, or a master batch pellet containing a polyolefin resin or the like as a matrix may be used.

The foaming agent may be a supercritical fluid foaming agent. In this case, the resin composition is molded by supercritical foaming in which the foaming agent is foamed in a supercritical state. In foam molding by supercritical foaming, it is preferred to use an inert gas to prevent oxidation of a resin and the like. In particular, nitrogen gas is versatile and is preferred as an inexpensive gas. In addition, in general supercritical foam molding, when the mass of the nitrogen gas is set to be 0.5 to 1 part by mass with respect to 100 parts by mass of the resin and the nitrogen gas is mixed with the resin under a high pressure condition in the range of 15 MPa to 25 MPa, a preferred supercritical state can be formed.

In the supercritical foam molding, the supercritical fluid foaming agent is not particularly limited as long as the supercritical fluid foaming agent is a substance that can become a supercritical fluid at a practically usable temperature and pressure. Examples thereof include inert gases such as carbon dioxide, nitrogen, argon, and helium, and water.

In addition, from the viewpoint of preventing deterioration of the resin, the supercritical fluid foaming agent that can be used in the invention is preferably a substance that is brought into a supercritical state at a temperature of 300° C. or lower under a pressure during molding. The pressure under which the supercritical fluid foaming agent is brought into the supercritical state is preferably 5 MPa or lower from a limit of a mold or the like of a molding machine during pressure resistant molding of a mounting valve or a pipe.

The resin composition for obtaining the molded article according to the invention preferably has an MFR in the range of 5 to 60. When the MFR is within this range, both good physical property and moldability can be achieved.

The resin composition according to the invention has a fine interface formed by highly dispersing a plurality of resin components that are not mutually dissolved. In addition, since cellulose fibers are entangled with each other, a fine space and an interface in contact with the space are formed in the resin composition. Therefore, in foaming using the supercritical fluid, the interface serves as a foaming starting point, fine bubbles can be uniformly present in the foam molded article, and properties such as weight reduction are sufficiently exhibited while the heat resistance and the strength are maintained. Further, by containing a predetermined amount of cellulose fibers, excellent low-temperature impact strength is obtained.

In a production method for the foam molded article using the supercritical fluid, first, the supercritical fluid is injected into the dissolved resin composition under a high pressure and the obtained mixture is stirred to obtain a single-phase dissolved product of the resin composition and the supercritical fluid. Next, by reducing the pressure, the supercritical fluid in the single-phase dissolved product undergoes phase transition to become a gas, and thus bubbles are generated. When a large number of foaming starting points are uniformly present, a foam molded article including a large number of fine foam particles is obtained. Accordingly, a resin composition for foaming is foamed, and a foam molded article having fine foam particles is obtained. The foaming ratio is preferably in the range of 1.1 times to 5 times the volume of the resin composition.

The foam molded article is preferably obtained by injection molding the resin composition. In particular, the foam molded article is preferably obtained by an injection molding method while impregnating the resin composition with the supercritical fluid (hereinafter, also referred to as supercritical injection molding). The resin composition can be processed into a foam molded article having a precise shape and various shapes by the supercritical injection molding. Among these, in the supercritical injection molding, it is preferred to foam the resin composition by a method of filling a cavity portion (cavity) of the mold with the resin composition in a molten state, and then forcibly expanding the cavity by moving a part of the mold before the progress of cooling and solidification to cause a rapid pressure decrease (hereinafter, referred to as a core-back method), and the foaming amount can be remarkably increased by using the core-back method. In addition, since the core-back method has a limitation in the shape of the mold and the mold is difficult to take a complicated shape, there is a method of pouring a small amount of a composition in the supercritical state into a general mold and filling the mold with the composition by foaming (hereinafter, referred to as a short shot method), and the article according to the invention also works well in the short shot method.

Since a molded article having excellent mechanical strength can be obtained, the resin composition according to the invention can be used for production of various molded articles. Specific uses of the molded article include: interior/exterior materials and housings for transportation machines such as automobiles, motorcycles, bicycles, railroads, drones, rockets, aircraft, and ships; energy machines such as wind power generators and hydroelectric power generators; housings of household appliances such as air conditioners, refrigerators, cleaners, microwave ovens, AV devices, digital cameras, and personal computers; electronic boards; communication device housings such as mobile phones and smartphones; medical instruments such as crutches and wheelchairs; shoes such as sneakers and business shoes; tires; sporting goods such as balls for ball sports, ski boots, snowboard boards, golf clubs, protectors, fishing lines, and artificial baits; outdoor goods such as tents and hammocks; electric wire covering materials; civil engineering and construction materials such as water tubes and gas tubes; building materials such as pillar materials, floor materials, decorative plates, window frames, and heat insulating materials; furniture such as bookshelves, desks, and chairs; robots such as industrial robots and domestic robots; hot melt adhesives; filaments and support agents for laminated 3D printers; coatings; binder resins for recording materials such as inks and toners; packaging materials such as films and tapes; resin containers such as PET bottles; eyeglass frames; and household goods such as trash boxes and mechanical pencil cases.

EXAMPLES

Hereinafter, the invention will be described in more detail with reference to the Examples, but is not limited to these Examples. Note that the "part" described in the following Examples is on a mass basis unless otherwise specified.

<Measurement Method for Melting Point and Melting Start Temperature>

The melting point was a crystal melting peak temperature (Tm) (° C.) obtained from a thermogram measured using a differential scanning calorimeter (DSC) when about 5 mg of a resin was heated from −40° C. to 250° C. at a heating rate of 10° C./min, held at 250° C. for 1 minute, then cooled to −40° C. at a cooling rate of 10° C./min, and heated again to 250° C. at a heating rate of 10° C./min. The melting start temperature, the melting start temperature was a temperature at which heat absorption from a baseline was started at the time of the second heating.

Measurement device: "DSC6300" manufactured by Seiko Instruments Inc.

<Measurement Method for Glass Transition Temperature>

As the glass transition temperature (Tg), the intermediate glass temperature (° C.) was used, which was obtained from a tangent line at which the baseline shift occurred when about 5 mg of a resin was heated from −40° C. to 250° C. at a heating rate of 10° C./min, held at 250° C. for 1 minute, then cooled to −40° C. at a cooling rate of 10° C./min, and heated again to 250° C. at a heating rate of 10° C./min.

Measurement device: "DSC6300" manufactured by Seiko Instruments Inc.

<GPC Measurement Condition>

Measurement device: "HLC-8320GPC" manufactured by Tosoh Corporation

Column:

guard column "HXL-L" manufactured by Tosoh Corporation

+"TSK-GEL G2000HXL" manufactured by Tosoh Corporation

+"TSK-GEL G2000HXL" manufactured by Tosoh Corporation

+"TSK-GEL G3000HXL" manufactured by Tosoh Corporation

+"TSK-GEL G4000HXL" manufactured by Tosoh Corporation

Detector: RI (differential refractometer)

Data processing: "GPC workstation EcoSEC-WorkStation" manufactured by Tosoh Corporation Measurement condition:

column temperature: 40° C.

developing solvent: tetrahydrofuran flow rate: 1.0 ml/min

Standard: the following monodisperse polystyrene having a known molecular weight was used based on a measurement manual of "GPC workstation EcoSEC-WorkStation".

(Polystyrene Used)

"A-500" manufactured by Tosoh Corporation

"A-1000" manufactured by Tosoh Corporation

"A-2500" manufactured by Tosoh Corporation

"A-5000" manufactured by Tosoh Corporation

"F-1" manufactured by Tosoh Corporation

"F-2" manufactured by Tosoh Corporation

"F-4" manufactured by Tosoh Corporation

"F-10" manufactured by Tosoh Corporation

"F-20" manufactured by Tosoh Corporation

"F-40" manufactured by Tosoh Corporation

"F-80" manufactured by Tosoh Corporation

"F-128" manufactured by Tosoh Corporation

Sample: a 1.0 mass % tetrahydrofuran solution in terms of a resin solid content, obtained by filtration with a microfilter (50 μl).

<Evaluation Method for Undefibered Cellulose>

The obtained compound was weighed by 0.2 g, and a sheet was prepared at a pressure of 10 MPa under a condition that a heat press was heated to 200° C. In a field of view in which the entire area of the prepared sheet was magnified 50 times with an optical microscope, the number of the undefibered material of cellulose defibering (A) and the aggregate thereof (hereinafter, referred to as the number of undefibered cellulose) of 1 mm or more was measured.

<Measurement Method for Elastic Modulus>

A portion of 70 mm in length of the produced molded article was cut out into a width of 25 mm in a TD direction to prepare a TD direction test piece. The flexural modulus of the obtained test piece was measured by a bending test according to ISO 178. Elastic modulus retention rates of the unfoamed body and the foamed body were compared with each other.

Test machine: "AUTOGRAPH AGS-X" manufactured by Shimadzu Corporation

Condition: bending Speed: 5 mm/min

Distance between fulcrums: 32 mm

Synthesis Example 1: Production of Amorphous Acrylic Resin

A four-necked flask equipped with a stirrer, a reflux condenser, a thermometer, and a nitrogen inlet tube was charged with 123 parts of isopropyl alcohol (hereinafter, referred to as "IPA"), and was heated to 80° C. Next, a dissolved mixture containing 135.3 parts of acrylamide, 108.2 parts of lauryl methacrylate, 2.5 parts of methyl acrylate, 246 parts of IPA, 4 parts of a polymerization initiator (an azo initiator, "V-59" manufactured by Wako Pure Chemical Industries, Ltd.), and 10 parts of methyl ethyl ketone (hereinafter, referred to as "MEK") was added drop-wise to IPA over 2 hours, and the reaction was carried out at 73° C. to 77° C. Thereafter, the inside of the reaction vessel was maintained in the same temperature range for 2 hours, and the polymerization reaction was terminated. The solvent was removed from the obtained resin solution using a pressure reduction pump (0.08 MPa to 0.095 MPa, 60° C.), and then the resin solution was dried by heating at 80° C. for 30 minutes using a dryer to obtain an amorphous acrylic resin as a solid. The acrylic resin had a glass transition temperature of 157° C. and a weight average molecular weight of 15,000.

Synthesis Example 2: Production of Amorphous Aqueous Urethane Resin

While introducing nitrogen gas to a reactor equipped with a thermometer, a nitrogen gas inlet tube, and a stirrer, 664 parts of terephthalic acid, 631 parts of isophthalic acid, 472 parts of 1,4-butanediol, 447 parts of neopentyl glycol, and 0.5 parts of dibutyltin oxide were charged into the reactor, and esterification was carried out at 180° C. to 230° C. for 5 hours, and then a polycondensation reaction was carried out at 230° C. for 6 hours until the acid value was less than 1. Then, the temperature was cooled to 120° C., 321 parts of adipic acid and 268 parts of dimethylolpropionic acid were added, and the mixture was heated again to 170° C. and reacted at this temperature for 20 hours to obtain a pendant carboxyl group-containing polyester polyol A having an acid value of 46.5 and a hydroxyl value of 59.8.

Under a reduced pressure at 120° C., 1880 parts of the polyester polyol A was dehydrated, and then cooled to 80° C. Thereafter, 1412 parts of methyl ethyl ketone was added and sufficiently stirred and dissolved, and then 238 parts of 4,4'-diphenylmethane diisocyanate was added and reacted at 70° C. for 8 hours. After the completion of the reaction, the reaction mixture was cooled to 40° C. and neutralized by adding 265 parts of 10% aqueous ammonia, and then 6090 parts of water was added to dissolve the neutralized product in water. Methyl ethyl ketone was removed at 65° C. under a reduced pressure from the obtained transparent reaction product, and then water was added to adjust the concentration, to obtain a transparent colloidal dispersion having a nonvolatile content of 25%. Further, butyl cellosolve was added to adjust the nonvolatile content to 20%. Note that the glass transition temperature of the solid content was 108° C.

Example 1: Production of Master Batch

Softwood bleached kraft pulp (NBKP) (average fiber diameter: 50 μm, average fiber length: 2 mm, manufactured by Howe Sounded Pulp and Paper) as a cellulose fiber raw material in a solid content of 50 parts was mixed with 18 parts of the acrylic resin obtained in Synthesis Example 1 (in terms of a solid content), 18 parts of high-density polyethylene (HDPE, J320 manufactured by Asahi Kasei Corporation, melting point: 130° C., melting start temperature: 47° C.) as a crystalline resin, 2 parts of polypropylene (PP, J106G manufactured by Prime Polymer Co., Ltd., melting point: 164° C.) as a crystalline resin, and 50 parts of water as a defibering auxiliary. The obtained mixture was melt-kneaded at 200° C. using KZW25 (manufactured by Technovel Corporation) as a kneading device to produce a master batch (MB1).

Example 2: Production of Resin Composition

The obtained master batch MB1 in an amount of 10 parts was mixed with 90 parts of polypropylene (PP, J106G manufactured by Prime Polymer Co., Ltd., melting point: 164° C.) as a thermoplastic resin, and the obtained mixture was melt-kneaded at 200° C. in KZW25 (manufactured by Technovel Corporation) as a kneading device to obtain a compound (CP1). The number of undefibered cellulose was observed by the above method, and was 0.

Example 3: Supercritical Foam Molding

A predetermined amount of the obtained compound (CP1) pellets and nitrogen brought into a supercritical state using a MuCell SCF device (model: T-100J) manufactured by TREXEL Corporation were injected into a cylinder of a J110AD injection molding machine manufactured by The Japan Steel Works, Ltd., and mixed with a molten resin composition, the mixture was injected into a mold, and subjected to supercritical foam molding by a short shot method to obtain a foamed body having a thickness of 2 mm, a length of 150 mm, a width of 150 mm.

The molding condition included a cylinder temperature of 190° C., a mold temperature of 40° C., a cooling time of 30 seconds, a back pressure of 15 MPa, a holding pressure of 12 MPa, a nitrogen inflow amount of 0.6 mass %, and an injection holding time of 2 seconds. A foam molded article having a weight reduction rate of about 15% was prepared. The elastic modulus of an unfoamed body was 2.4 GPa, the elastic modulus of a foamed body (weight reduction rate was 14.9%) was 1.9 GPa, and the elastic modulus retention rate was 79.2%.

Example 4

A master batch (MB2) was prepared in the same manner as in Example 1 except that HDPE was changed to linear low-density polyethylene (LLDPE, UJ370 manufactured by Japan Polyethylene Corporation, melting point: 121° C., melting start temperature: 36° C.), and a compound (CP2) was obtained in the same manner as in Example 2. The undefibered cellulose was evaluated in the same manner as in Example 2, and the number of undefibered cellulose observed was 0. The elastic modulus of a test piece obtained by performing supercritical foam molding in the same manner as in Example 3 was evaluated.

Example 5

A master batch (MB3) was prepared in the same manner as in Example 1 except that HDPE was changed to low-density polyethylene (LDPE, 11803 manufactured by Japan Polyethylene Corporation, melting point: 108° C., melting start temperature: 29° C.), and a compound (CP3) was obtained in the same manner. The number of undefibered cellulose observed was 0. The elastic modulus of a test piece obtained by performing supercritical foam molding in the same manner as in Example 3 was evaluated.

Example 6

A master batch (MB4) was prepared in the same manner as in Example 1 except that the addition rate of HDPE was changed to 20 parts and the number of added parts of PP as a thermoplastic resin was changed to 0 parts, and a compound (CP4) was obtained in the same manner as in Example 2. The number of undefibered cellulose observed was 0. The elastic modulus of a test piece obtained by performing supercritical foam molding in the same manner as in Example 3 was evaluated.

Example 7

A master batch (MB5) was prepared in the same manner as in Example 1 except that 2 parts of the thermoplastic resin PP was changed to 2 parts of polyamide 6 (PA6, melting point: 234° C.) added, and a compound (CP5) was obtained in the same manner as in Example 2 except that PP was changed to PA6 and the mixture was melt-kneaded at 250° C. The number of undefibered cellulose observed was 1.

The elastic modulus of a test piece obtained by performing supercritical foam molding in the same manner as in Example 3 was evaluated except that the cylinder temperature was set to 250° C.

Example 8

A master batch (MB6) was prepared in the same manner as in Example 6 except that the defibering auxiliary was changed to 49 parts of water and 1 part of isopropanol (IPA), and a compound (CP6) was obtained in the same manner as in Example 2. The number of undefibered cellulose observed was 0. The elastic modulus of a test piece obtained by performing supercritical foam molding in the same manner as in Example 3 was evaluated.

Example 9

A compound (CP7) was obtained in the same manner as in Examples 1 and 2 except that "the acrylic resin obtained in Synthesis Example 1" as an amorphous resin was changed to "the urethane resin obtained in Synthesis Example 2". The ratios of use of the solid content were the same. The undefibered cellulose was evaluated in the same manner as in Example 1, and the number of undefibered cellulose observed was 0. The elastic modulus of a test piece obtained by performing supercritical foam molding in the same manner as in Example 3 was evaluated.

Comparative Example 1

A compound was obtained in the same manner as in Example 2 except that 92 parts of PP, 5 parts of NBKP, and 3 parts of the acrylic resin in Synthesis Example 1 were mixed without forming a master batch. The number of undefibered cellulose observed was 121. The elastic modulus of a test piece obtained by performing supercritical foam molding in the same manner as in Example 3 was evaluated.

Comparative Example 2

A compound was obtained in the same manner as in Example 2 except that 93 parts of PP, 5 parts of NBKP, and 2 parts of HDPE were mixed without forming a master batch. The number of undefibered cellulose observed was 433. The elastic modulus of a test piece obtained by performing supercritical foam molding in the same manner as in Example 3 was evaluated.

Comparative Example 3

A compound was obtained in the same manner as in Example 2 except that 92 parts of PP, 5 parts of NBKP, 3 parts of the acrylic resin in Synthesis Example 1, and 2 parts of stearic acid (melting point: 70° C.) instead of HDPE were mixed without forming a master batch. The number of undefibered cellulose observed was 87. The elastic modulus of a test piece obtained by performing supercritical foam molding in the same manner as in Example 3 was evaluated.

TABLE 1

| | Example 3 | Example 4 | Example 5 | Example 6 | Example 7 | Example 8 | Example 9 |
|---|---|---|---|---|---|---|---|
| Elastic modulus of unfoamed body | 2.4 | 2.4 | 2.4 | 2.4 | 3.0 | 2.4 | 2.4 |
| Weight reduction rate | 14.9 | 15.3 | 15.1 | 15.2 | 15.0 | 15.3 | 15.2 |
| Elastic modulus after foaming | 1.9 | 1.8 | 1.9 | 1.8 | 2.3 | 1.8 | 1.8 |
| Elastic modulus retention rate | 79.2 | 75.0 | 79.2 | 75.0 | 76.7 | 75.0 | 75.0 |

TABLE 2

| | Comparative Example 1 | Comparative Example 2 | Comparative Example 3 |
|---|---|---|---|
| Elastic modulus of unfoamed body | 2.6 | 2.6 | 2.4 |
| Weight reduction rate | 15.2 | 15.1 | 14.8 |
| Elastic modulus after foaming | 1.4 | 1.3 | 1.5 |
| Elastic modulus retention rate | 53.8 | 50.0 | 62.5 |

The invention claimed is:

1. A production method for a master batch, comprising:

a step of melt-kneading an aggregate of a cellulose fiber (A), an amorphous resin (B) having a glass transition temperature of 160° C. or lower, a crystalline resin (C) having a melting point (melting peak temperature) of 80° C. to 150° C. and a melting start temperature lower than the melting point by 30° C. or more, and a defibering auxiliary (E) having a boiling point of 120° C. or lower;

wherein:

the amorphous polymer (B) is a polymer having an ester bond, an ether bond, a urea bond, a hydroxyl group, an amino group, or a carboxyl group;

the crystallizable polymer (C) is an olefin-based polymer; and wherein:

the amorphous resin (B) is present in an amount ranging from 5 parts by mass or more to 100 parts by mass or less based on 100 parts by mass of solid content of the aggregate of cellulose fiber (A); and the crystalline resin (C) is present in an amount ranging from 10 parts by mass or more to 150 parts by mass or less based on 100 parts by mass of solid content of the aggregate of cellulose fiber (A).

2. The production method for a master batch according to claim 1, wherein the defibering auxiliary (E) is one or more auxiliary selected from a water-soluble alcohol, a ketone, an ether, and water.

3. A production method for a resin composition, comprising:

a step of producing a master batch by the production method according to claim 1; and a step of melt-kneading a thermoplastic resin (D) having a melting point or a glass transition temperature higher than the melting point of the crystalline resin (C) in the master batch by 5° C. or more;

wherein the thermoplastic resin (D) is polypropylene, a poly acetal, or a polyamide.

4. A production method for a molded article, comprising:

a step of producing a resin composition by the production method according to claim 3; and a step of molding the obtained resin composition.

5. The production method for a molded article according to claim 4, wherein the step of molding the resin composition is a supercritical molding method.

* * * * *